United States Patent
Missfeldt et al.

(12)
(10) Patent No.: US 6,258,523 B1
(45) Date of Patent: Jul. 10, 2001

(54) CYANINE DYES

(75) Inventors: Michael Missfeldt, Leichlingen; Stefan Herrmann, Bonn, both of (DE)

(73) Assignee: Agfa-Gevaert (BE)

( * ) Notice: Subject to any disclaimer, the term of this patent is extended or adjusted under 35 U.S.C. 154(b) by 0 days.

(21) Appl. No.: 09/393,673

(22) Filed: Sep. 10, 1999

(30) Foreign Application Priority Data

Sep. 19, 1998 (DE) .............................. 198 43 082

(51) Int. Cl.[7] .................. G03C 1/18; G03C 1/20
(52) U.S. Cl. ............ 430/584; 430/543; 430/585
(58) Field of Search ..................... 430/583, 574, 430/584, 505, 543

(56) References Cited

U.S. PATENT DOCUMENTS

| | | |
|---|---|---|
| 5,512,428 | 4/1996 | Missfeldt . |
| 5,516,628 | 5/1996 | Parton et al. . |
| 5,858,639 | * 1/1999 | Missfeldt ............... 430/584 |
| 5,942,382 | 8/1999 | Sinszer et al. . |

FOREIGN PATENT DOCUMENTS

| | | |
|---|---|---|
| 1 053 309 | 3/1959 | (DE) . |
| 197 24 585 | 12/1998 | (DE) . |
| 0 648 813 | 4/1995 | (EP) . |

OTHER PUBLICATIONS

The Theory of Photographic process, Fourth Edition, T. H James, pp. 194–1999, 1977.*

* cited by examiner

Primary Examiner—Thorl Chea
(74) Attorney, Agent, or Firm—Connolly Bove Lodge & Hutz LLP

(57) ABSTRACT

The present application provides cyanine dyes of the formula (1)

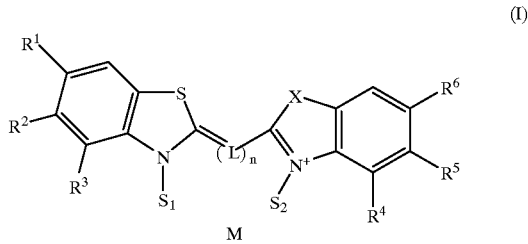

(I)

in which $R^1, R^2, R^3, R^4, R^5, R^6$ mutually independently mean H, a substituent or $R^5$ together with $R^6$ or $R^4$ together with $R^5$ mean the remaining members to complete an optionally substituted fused benzo ring or naphtho ring system, providing that at least one of the substituents $R^1$, $R^2$ or $R^3$ is a benzothienyl substituent, X denotes O, S, Se, CH=CH, $C(CH_3)_2$ or $NR_7$ ($R_7$ =optionally substituted alkyl), $S_1$, $S_2$ mutually independently mean alkyl, sulfoalkyl, carboxyalkyl, $-(CH_2)_1-SO_2-Y-SO_2$-alkyl, $-(CH_2)_1-SO_2-Y-CO$-alkyl, $-(CH_2)_1-CO-Y-SO_2$-alkyl, $-(CH_2)_1NHSO^-_3$, $-(CH_2)_1N(alkyl)SO^-_3$, $-(CH_2)_1N(aryl)SO^-_3$, $-(CH_2)_1-CO-Y-CO$-alkyl, providing that 1 means 1 to 6 and Y means NH or $N^-$, n means 3, 5 or 7, L denotes substituted or unsubstituted methine groups, which may be constituents of one or more carbocyclic rings, and M denotes a counterion optionally necessary to equalise charges as well as colour photographic materials containing cyanine dyes of the formula (I) and the use of compounds of the formula (I) as spectral sensitisers.

11 Claims, No Drawings

CYANINE DYES

This invention relates to cyanine dyes according to the formula (I), and to a colour photographic material which contains cyanine dyes of the formula (I) and to the use of compounds of the formula (I) as spectral sensitisers.

Improving the spectral sensitivity of photographic materials is a constant challenge. By using polymethine dyes, it is possible to extend sensitivity beyond the intrinsic sensitivity range. Cyanines are particularly suitable for this purpose. DE 1 053 309 discloses spectral sensitisers having a thienyl substituent on the benzene ring, which give rise to good spectral sensitivities on silver halide emulsions.

There is, however, a requirement for spectral sensitisers which have increased spectral sensitivity, especially when used in tab-grain emulsions.

The object of the present invention is to provide cyanine dyes which are distinguished by particularly elevated spectral sensitivity and simultaneously by good storage stability, in particular under tropical conditions.

It has surprisingly been found that cyanine dyes of the formula (I), in which at least one of the substituents $R^1$, $R^2$ or $R^3$ denotes benzothienyl, have excellent spectral sensitivity accompanied by good storage stability, in particular under tropical conditions.

The present application provides cyanine dyes of the formula (I)

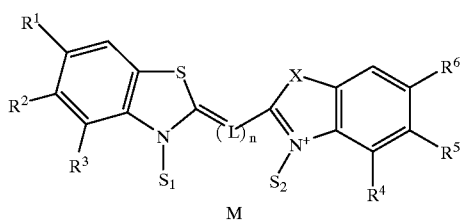

(I)

in which $R^1$, $R^2$, $R^3$, $R^4$, $R^5$, $R^6$ mutually independently mean H, a substituent or $R^5$ together with $R^6$ or $R^4$ together with $R^5$ mean the remaining members to complete an optionally substituted fused benzo ring or naphtho ring system, providing that at least one of the substituents $R^1$, $R^2$ or $R^3$ is a benzothienyl substituent, X denotes O, S, Se, CH=CH, $C(CH_3)_2$ or $NR_7$ ($R_7$ =optionally substituted alkyl), $S_1$, $S_2$ mutually independently mean alkyl, sulfoalkyl, carboxyalkyl, $-(CH_2)_1-SO_2-Y-SO_2$-alkyl, $-(CH_2)_1-SO_2-Y-CO$-alkyl, $-(CH_2)_1-CO-Y-SO_2$-alkyl, $-(CH_2)_1NHSO^-_3$, $-(CH_2)_1N(alkyl)SO^-_3$, $-(CH_2)_1N(aryl)SO^-_3$, $-(CH_2)_1-CO-Y-CO$-alkyl, providing that 1 means 1 to 6 and Y means NH or $N^-$, n means 3, 5 or 7, L denotes substituted or unsubstituted methine groups, which may be constituents of one or more carbocyclic rings, and M denotes a counterion optionally necessary to equalise charges.

The benzothienyl residue may be attached to the benzo ring via position 2, 3, 4, 5, 6 or 7.

For the purposes of the present application, unless otherwise defined, a substituent should be taken to mean halogen, in particular fluorine, chlorine or bromine, alkyl, alkoxy, aryl, aryloxy, hetaryl and alkenyl substituents as well as $CF_3$, CN or, where X=S, a benzothienyl substituent, which is attached via position 2, 3, 4, 5, 6 or 7 to the benzo ring.

For the purposes of the present application, alkyl should be taken to mean linear or branched, cyclic or linear, substituted or unsubstituted hydrocarbon groups, preferably alkyl groups having 1 to 20 C. atoms, in particular 1 to 6 C. atoms; open-chain alkyl groups which may be considered are in particular methyl, ethyl, n-propyl, n-butyl and n-pentyl while branched alkyl residues which may be considered are in particular methyl- or ethyl-branched.

For the purposes of the present invention, alkenyl should be taken to mean linear or branched, cyclic or linear, substituted or unsubstituted unsaturated hydrocarbon residues, such as for example ethenyl, 2-propenyl.

For the purposes of the present application, aryl should be taken to mean aromatic hydrocarbon groups, wherein they preferably comprise 5- or 6-membered ring systems, which may be in the form of monocyclic or also fused ring systems. These may comprise both substituted and unsubstituted ring systems. Phenyl and naphthyl groups are, for example, particularly preferred.

For the purposes of the present application, unless otherwise defined, hetaryl should be taken to mean aromatic systems which contain at least one heteroatom. These may comprise both substituted and unsubstituted ring systems. Typical examples are pyridine, pyridazine, pyrimidine, pyrazines, oxazole, isoxazole, thiazoles, 3,4-oxadiazole, 1,2,4-oxadiazole, imidazole, indole, 1,2,3-triazole, 1,2,4-triazole; particularly preferred heterocyclic substituents are 2-furanyl, 3-furanyl, pyrrolyl, 2-thienyl, 3-thienyl and indolyl.

For the purposes of the present application, alkoxy should be taken to mean substituents of the formula OR in which the R denotes an alkyl residue having the meaning stated above. Such substituents comprise, for example, methoxy, ethoxy, propoxy or butoxy substituents.

For the purposes of the present application, aryloxy should be taken to mean substituents of the formula OR, in which the R denotes an aryl residue having the meaning stated above. Such substituents comprise, for example, phenoxy or naphthoxy substituents.

For the purposes of the present invention, unless otherwise defined, counterions M which may be considered, depending upon the substituents and thus charge relationships, are for example the following compounds: tosylate, $I^-$, $Br^-$, $Cl^-$, preferably diazabicyclooctane-$H^+$ (DABCO$H^+$) or diazabicycloundecane-$H^+$(DBU$H^+$), in particular $Na^+$, $Li^+$, $K^+$ and particularly preferably $Et_3N^+H$.

n denotes 7, preferably 5, in particular 3,

L may, for example, denote=C– or, as a constituent of a ring system

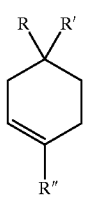

The following combinations may arise from the above: for

for
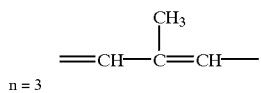
n = 3
or perferably
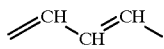
or
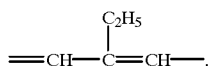
For n=5
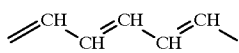
or perferably
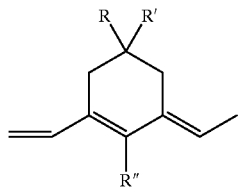
for n=7
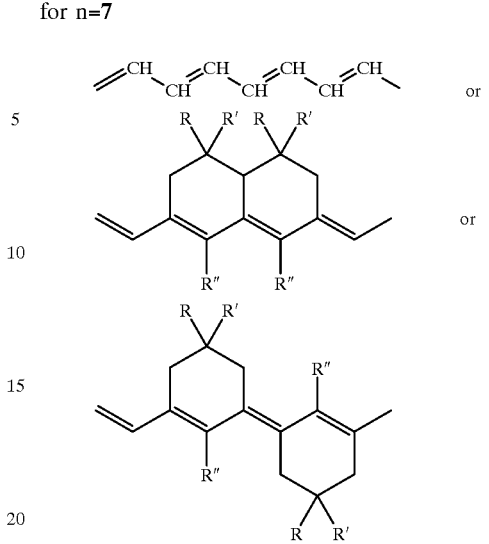
or perferably
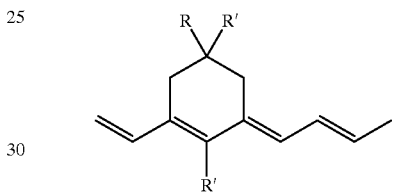
R and R' preferably denote H, aryl or alkyl and R" denotes H, halogen, N-tetrahydro-pyrrolyl, N-piperidinyl, N-(alkyl)$_2$, N-(aryl)$_2$ or S-alkyl.
Sensitisers which are preferably to be used according to the present invention are listed below:
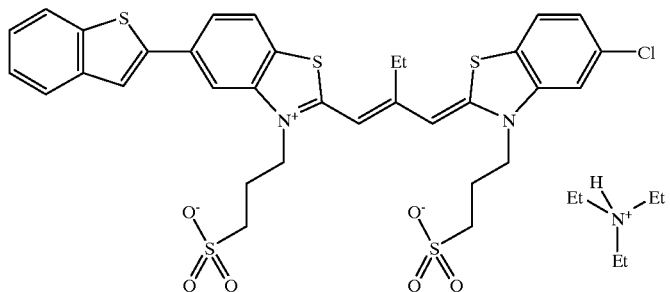
I-1
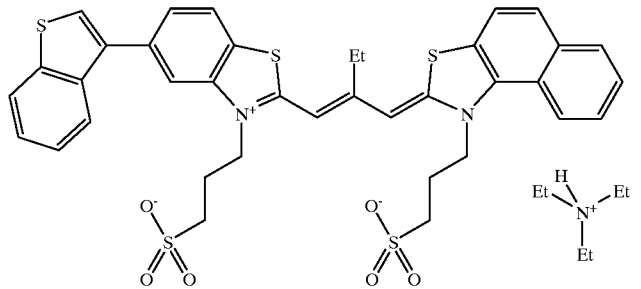
I-2

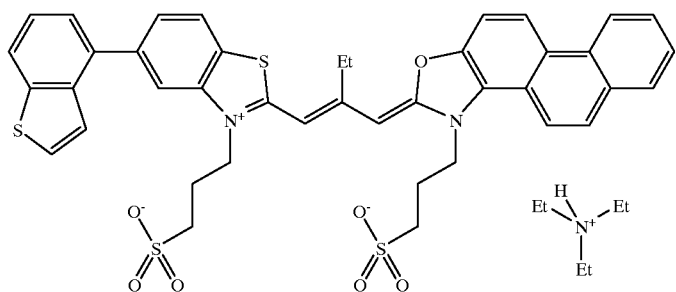
I-3
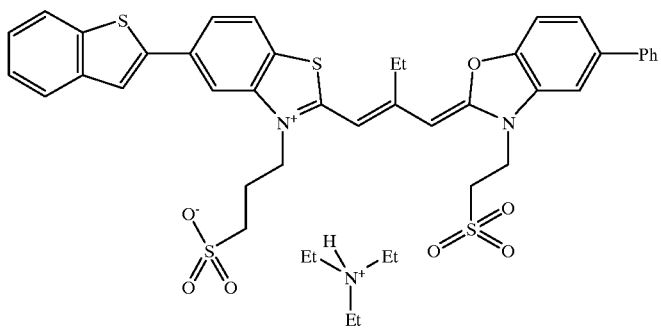
I-4
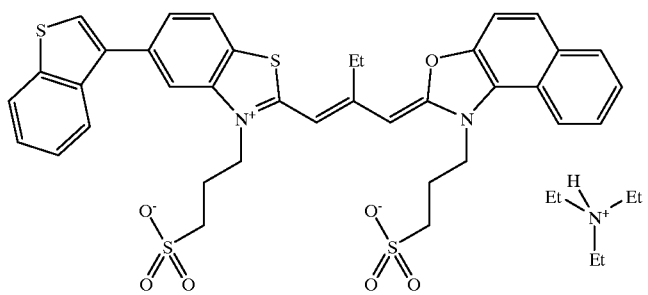
I-5
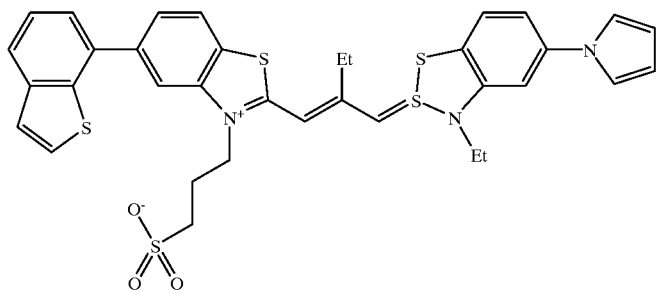
I-6
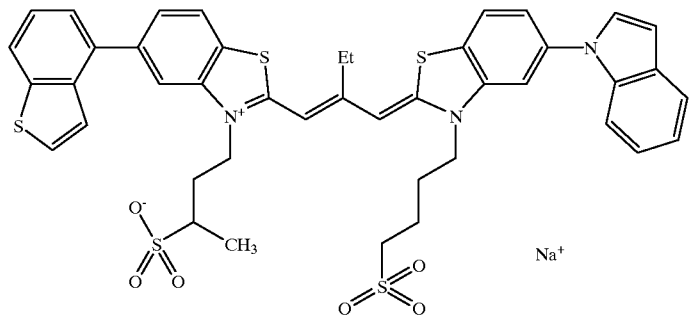
I-7

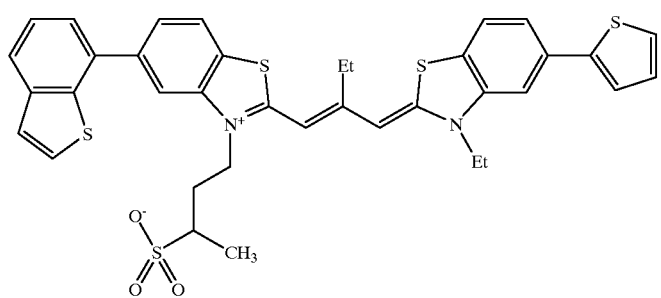
I-8
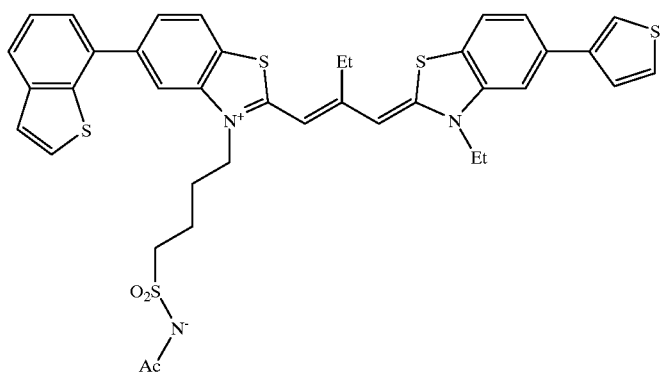
I-9
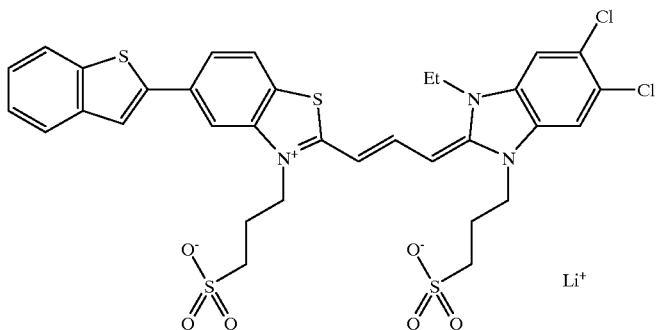
I-10
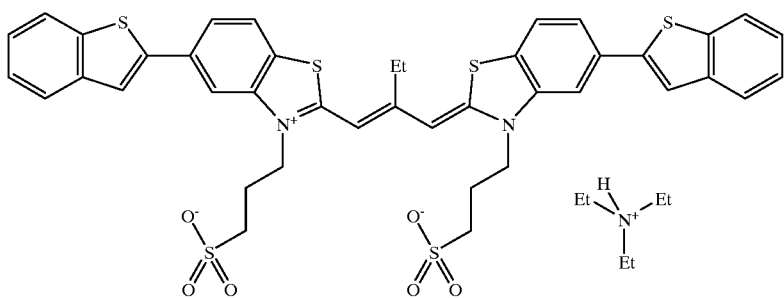
I-11
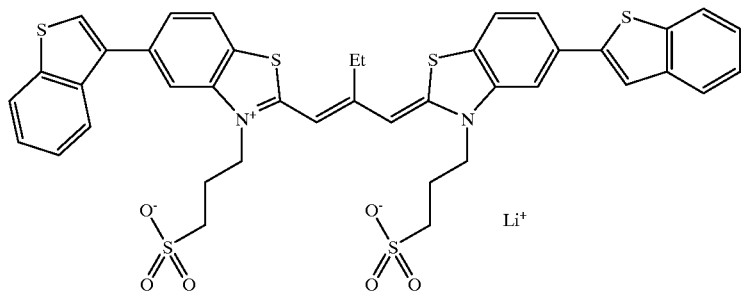
I-12

-continued
I-13
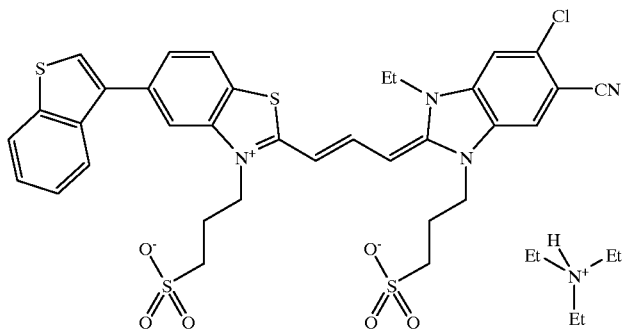
I-14
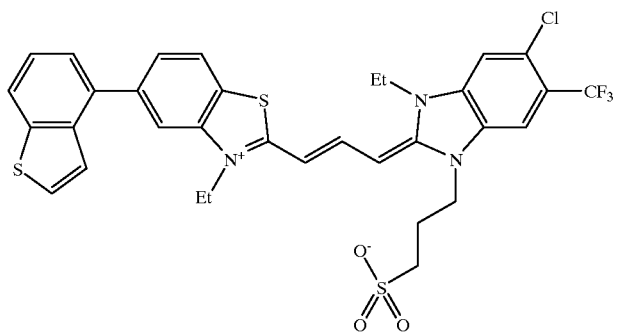
I-15
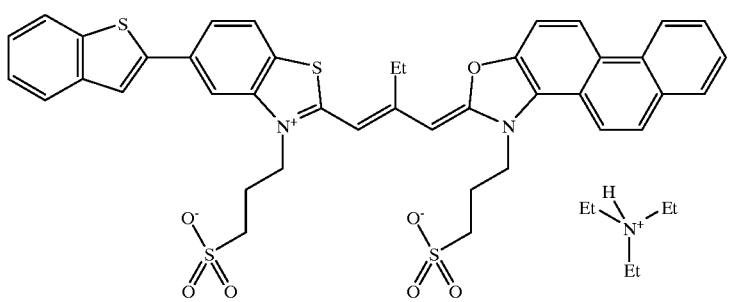
I-16
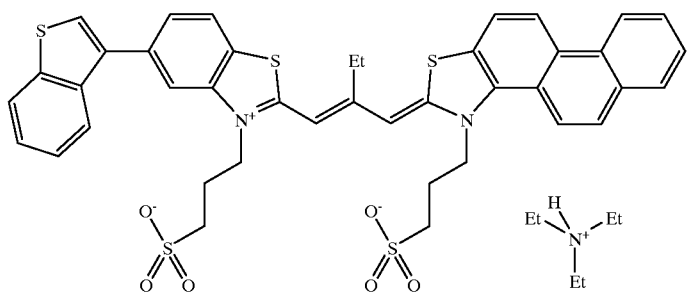
I-17
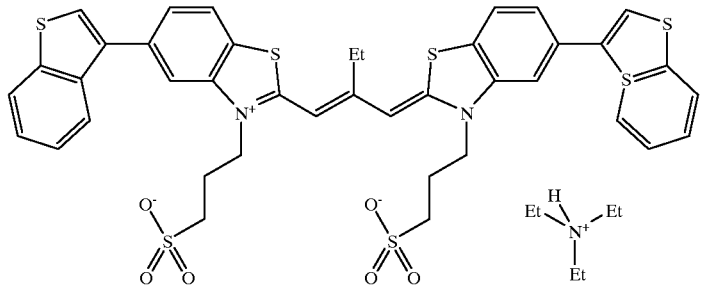

-continued
I-18
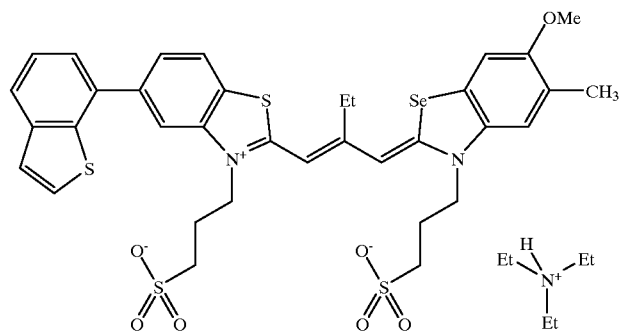
I-19
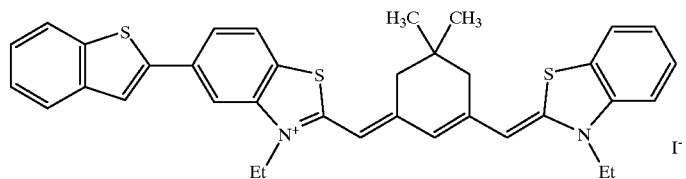
I-20
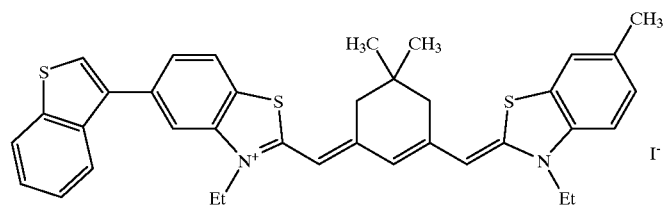
I-21
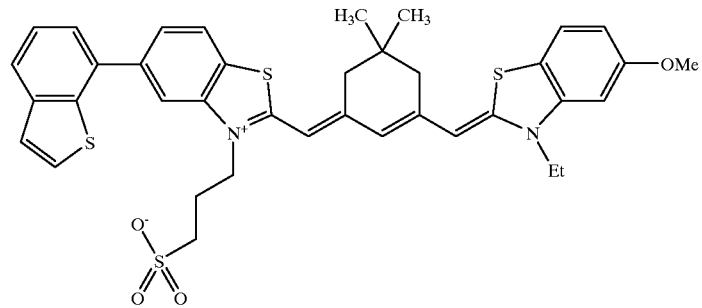
I-22
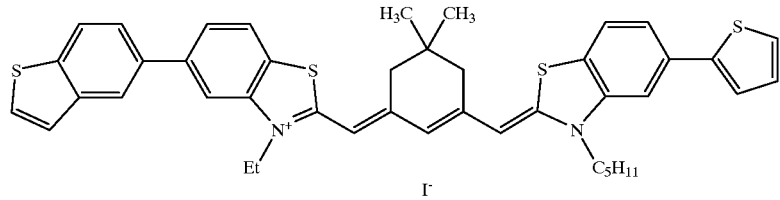
I-23
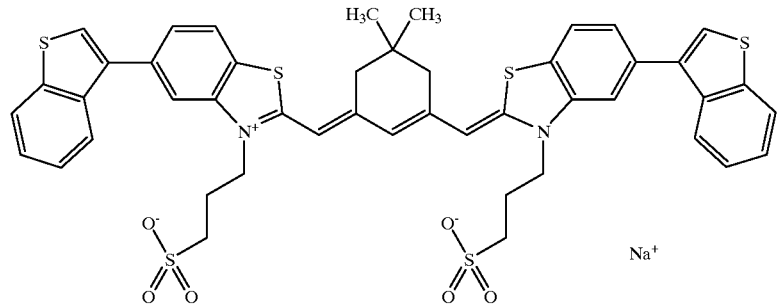

I-24

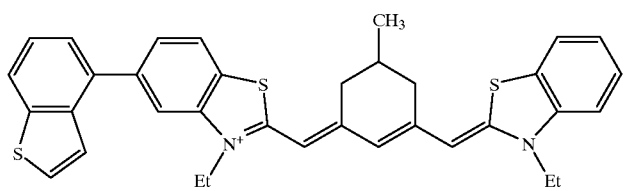

I-25

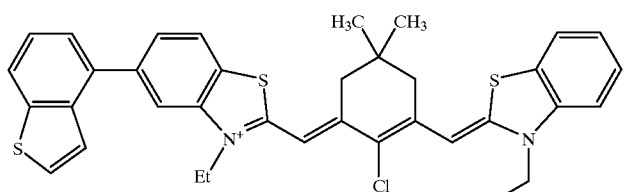

I-26

In the formulae I-1 to I-26, "Me" means methyl, "Et" means ethyl, "Ph" means phenyl and "TosO−" means toluenesulfonate.

Synthesis of dye I-11

6 was synthesised in a similar manner to the methods described in *J Heterocyclic Chem.*, 25, 1437 (1988). Catalytic hydrogenation to yield 7 proceeded in an autoclave with Ra-Ni as catalyst. 8 was formed from 7 in a similar manner to a method described in *Chem. Ber.*, 36, 3121 (1903). Saponification of 8 with aqueous alkali and subsequent acetylation gives rise to the diacetyl compound 9, which is thermally cyclised at 180–200° C. to yield the thiazole base 10.

Synthesis of the quaternary salt 11

1.41 g (5 mmol) of 10 and 0.61 g (5 mmol) of 1,3-propanesultone are stirred for 8 hours at 150° C. in 4 ml of dichlorobenzene. After cooling to room temperature, 20 ml of acetone is added, the mixture is briefly brought to boiling, is suction filtered once cool and thoroughly rewashed with acetone. The residue is decocted in 20 ml of methanol.

Yield: 1.63 g (81% of theoretical)

Synthesis of dye I-11

1.61 g (4 mmol) of 11 are dissolved in 10 ml of m-cresol with heating and, at an internal temperature of approx. 100° C., combined with 5.29 g (30 mmol) of ortho-propionic acid triethyl ester and stirred for 30 minutes at 95° C. After cooling to room temperature, a solution of 1.61 g (4 mmol) of 11, dissolved in 10 ml of m-cresol, is added and 1.78 ml (12.8 mmol) of triethylamine are apportioned at room temperature within 5 minutes. After 2 hours' stirring at 90° C., the mixture is allowed to cool to room temperature and stirring is continued for a further 2 hours. The dye solution is introduced into 75 ml of acetone within 45 minutes. The dye solution is left to crystallise overnight, suction filtered and thoroughly rewashed with acetone. The crude dye is dissolved in 60 ml m-cresol with heating, hot-filtered and combined with 180 ml of acetone. The dye is left to crystallise overnight, is suction filtered and thoroughly washed with acetone. After drying to constant weight under a vacuum at 50° C., 1.55 g (41% of theoretical) of dye is obtained.

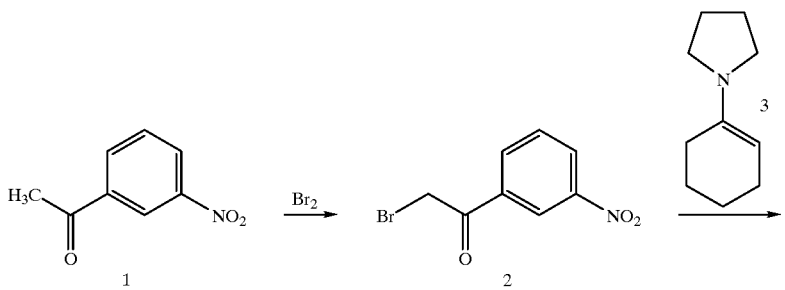

-continued
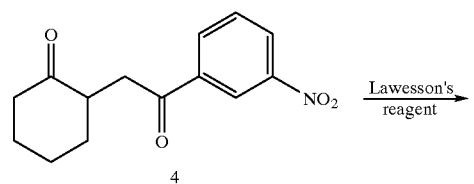
4
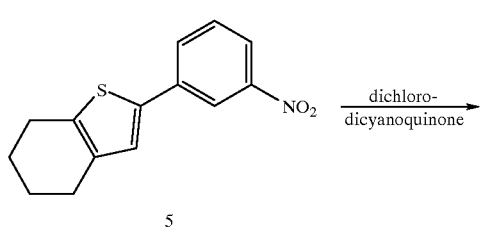
5
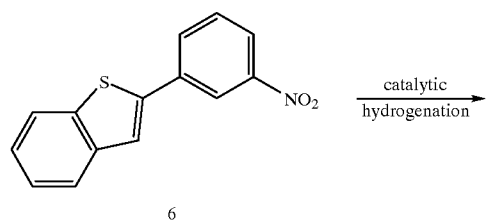
6
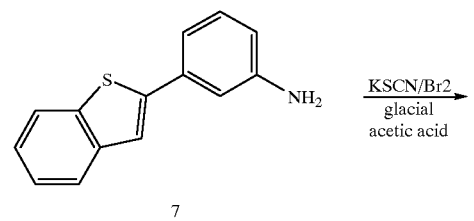
7
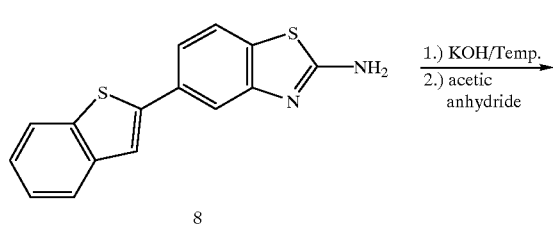
8
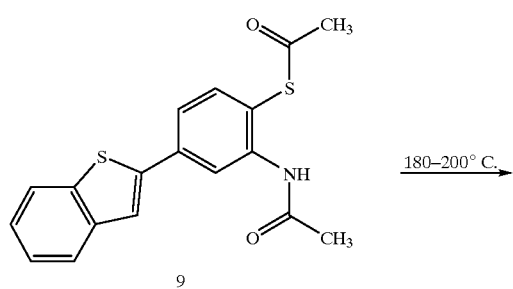
9
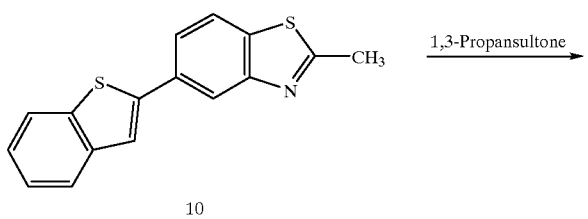
10

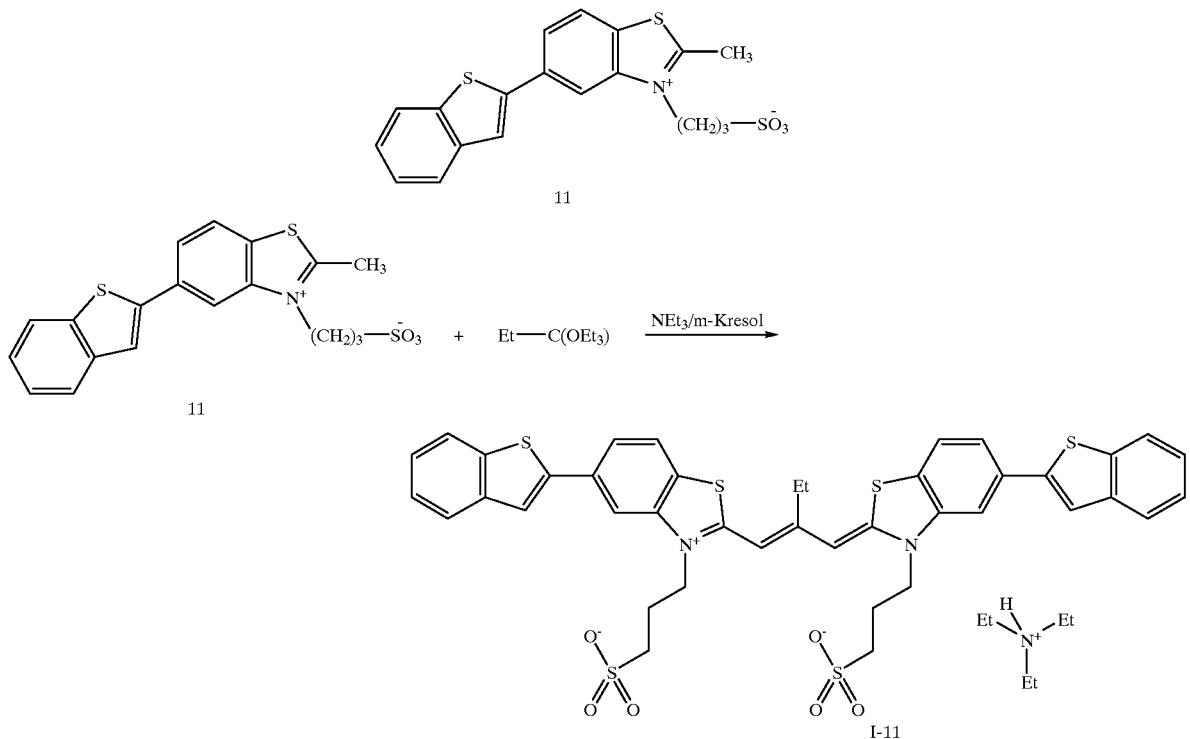

The cyanines according to the invention may also be produced by using the synthesis methods which are described in *"The Cyanine Dyes & Related Compounds"* by Frances M. Hamer, Interscience Publishers (1964).

The cyanine dyes according to the invention bring about not only an elevated spectral sensitivity but also a stable sensitisation in the green range of the spectrum between 520 and 590 nm, in the red range of the spectrum between 590 and 680 or 680 to 750 nm and in the infra-red range of the spectrum.

Still higher sensitivity is achieved if at least one representative of the formula (II) is added to at least one representative of the formula (I):

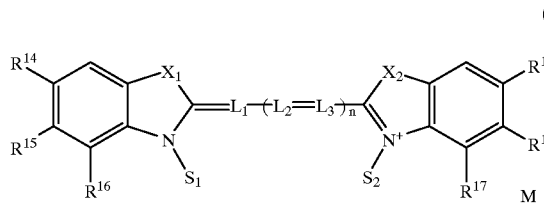

(II)

in which formula II $X_1$, $X_2$ mutually independently denote O, S, Se, CH=CH, C(CH$_3$)$_2$ or NR$_7$ (R$_7$ =optionally substituted alkyl), $S_1$, $S_2$ mutually independently mean alkyl, sulfoalkyl, carboxyalkyl,—(CH$_2$)$_l$—SO$_2$—Y—SO$_2$-alkyl, —(CH$_2$)$_l$—SO$_2$—Y—CO-alkyl, —(CH$_2$)$_l$—CO—Y—SO$_2$-alkyl, —(CH$_2$)$_l$—CO—Y—CO-alkyl (l=1–6, Y: NH, N$^-$), $R^{14}$, $R^{15}$, $R^{16}$, $R^{17}$, $R^{18}$, $R^{19}$ mutually independently denote H, halogen, preferably fluorine, chlorine, bromine, alkyl, alkoxy, phenyl, 2-thienyl, 3-thienyl, 1-pyrrolyl, 1-indolyl, 2-furanyl, 3-furanyl, CN, CF$_3$, aryl; or $R^{14}$ together with $R^{15}$ or $R^{15}$ together with $R^{16}$ or $R^{19}$ together with $R^{18}$ or $R^{18}$ together with $R^{17}$ denote the remaining members to complete an optionally substituted fused benzo or naphtho ring system, n means 0 or 1, $L_1$, $L_2$, $L_3$ mutually independently denote substituted or unsubstituted methine groups and M denotes a counterion optionally necessary to equalise charges.

Preferred examples of compounds according to the formula (II) are:

(II)-1

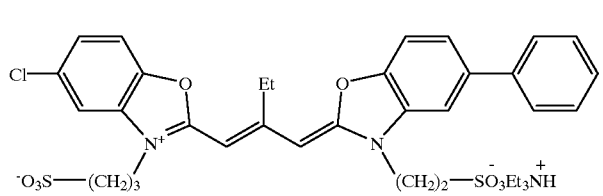

-continued
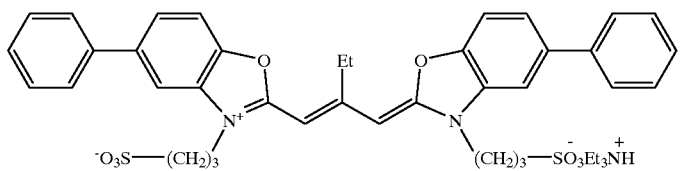
(II)-2
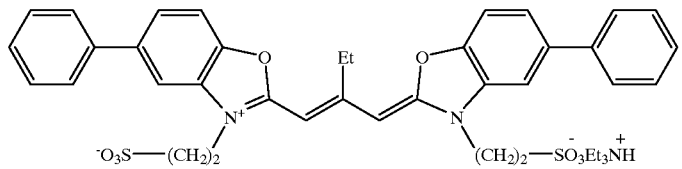
(II)-3
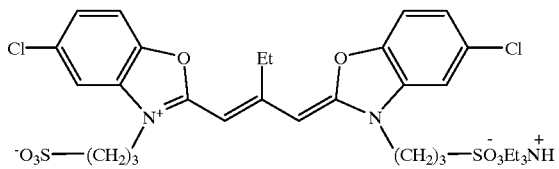
(II)-4
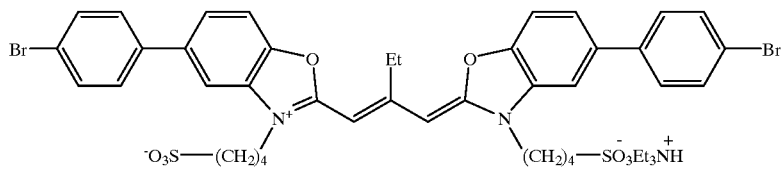
(II)-5
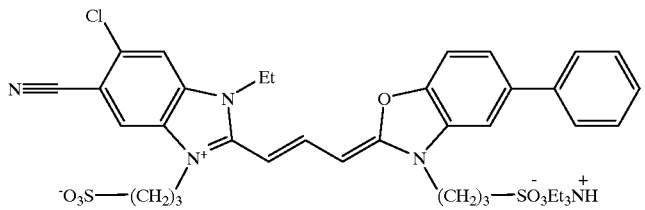
(II)-6
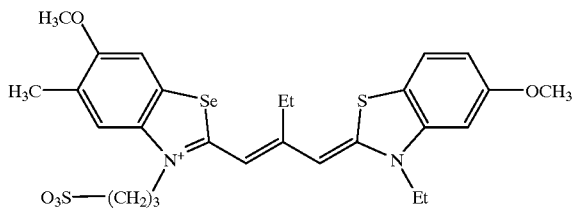
(II)-7
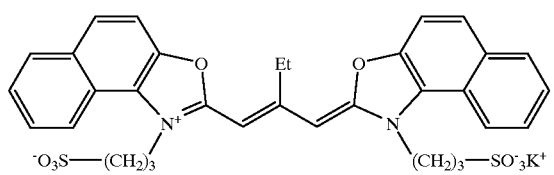
(II)-8
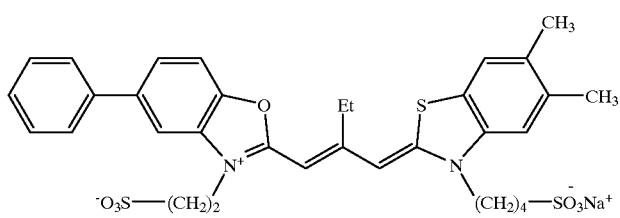
(II)-9

-continued
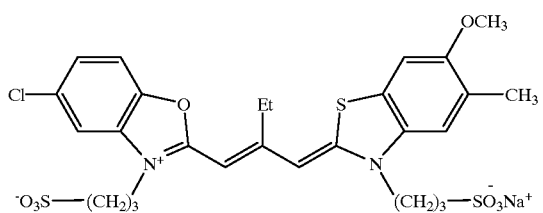
(II)-10
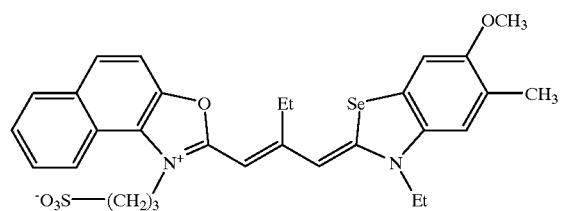
(II)-11
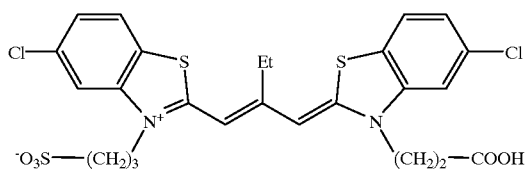
(II)-12
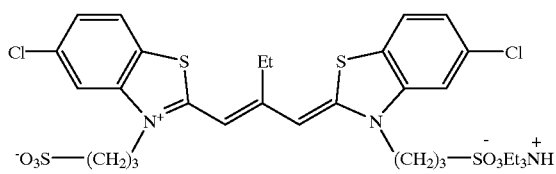
(II)-13
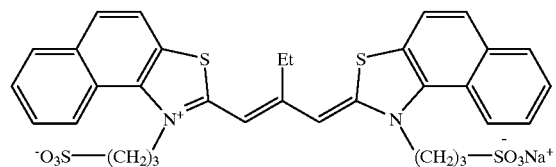
(II)-14
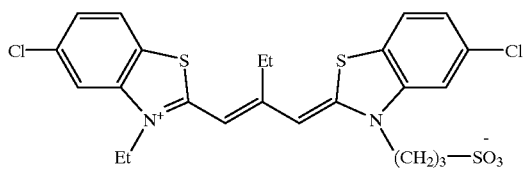
(II)-15
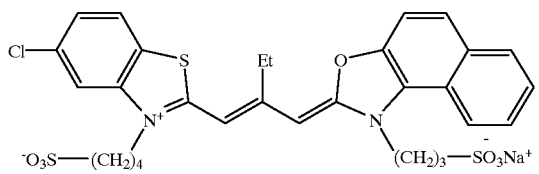
(II)-16
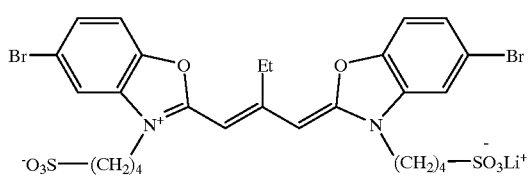
(II)-17

(II)-18

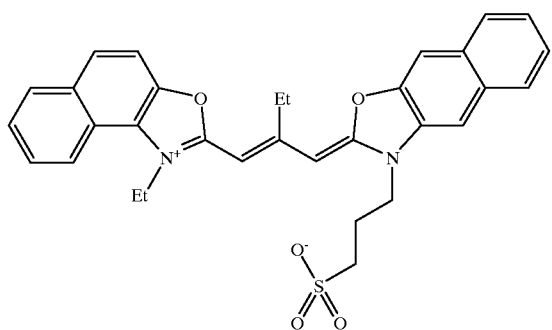

(II)-19

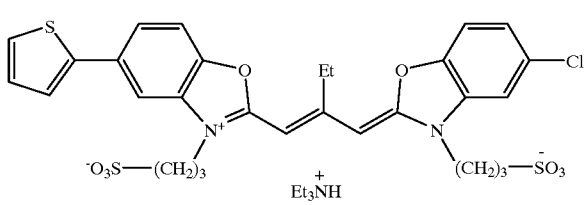

(II)-20

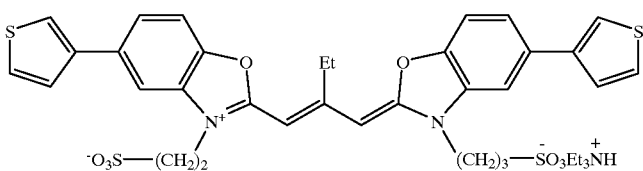

By joint use of compounds of the formulae (I) and (II), it is possible to achieve still higher spectral sensitivity, combined with excellent tropical stability. Compounds (I) and (II) may be present in a mixture ratio of 0.1:10 to 10:0.1. A mixture ratio of the cyanine dyes of the formula (I) to those of the formula (II) of 1:20 to 20:1 is particularly preferred.

According to the present invention, at least one compound of the formula (I) is used, preferably three compounds of the formula (I) are used. As mentioned above, a blend with compounds of the formula (II) is particularly preferred. In this blend, it is preferred to use two compounds according to the formula (I) with one compound of the formula (II), or two compounds according to the formula (II) with one compound of the formula (I). A particularly preferred blend is one in which the individual compounds are each used in equal molar quantities.

The present invention also provides a colour photographic material containing cyanine dyes of the formula (I), preferably together with compounds of the formula (II). According to the invention, the cyanine dyes may be added to the colour photographic materials in conventional quantities, for example of 1 to 3000, preferably of 100 to 2000 and in particular of 200 to 900 $\mu$mol/mol of $AgNO_3$. The resultant colour photographic materials are distinguished by particularly elevated spectral sensitivity, which is retained even after storage under extreme conditions (tropical conditions).

For the purposes of the present invention, tropical conditions should be taken to mean conditions comprising a relative atmospheric humidity of preferably 90% and temperatures of preferably 35° C. The samples are conventionally stored under the particular conditions for period of 7 days.

The present invention furthermore provides the use of the compounds of the formula (I) as spectral sensitisers.

Examples of colour photographic materials are colour negative films, colour reversal films, colour positive films, colour photographic paper, colour reversal photographic paper, colour-sensitive materials for the dye diffusion transfer process or the silver dye bleaching process. A review is given in Research Disclosure 37038 (1995) and Research Disclosure 38957(1996).

The photographic materials consist of a support onto which at least one photosensitive silver halide emulsion layer is applied. Thin films and sheets are in particular suitable as supports. A review of support materials and the auxiliary layers applied to the front and reverse sides of which is given in Research Disclosure 37254, part 1 (1995), page 285 and in Research Disclosure 38957, part XV (1996), page 627.

The colour photographic materials conventionally contain at least one red-sensitive, one green-sensitive and one blue-sensitive silver halide emulsion layer, optionally together with interlayers and protective layers.

Depending upon the type of the photographic material, these layers may be differently arranged. This is demonstrated for the most important products:

Colour photographic films such as colour negative films and colour reversal films have on the support, in the stated sequence, 2 or 3 red-sensitive, cyan-coupling silver halide emulsion layers, 2 or 3 green-sensitive, magenta-coupling silver halide emulsion layers and 2 or 3 blue-sensitive, yellow-coupling silver halide emulsion layers. The layers of identical spectral sensitivity differ with regard to their photographic sensitivity, wherein the less sensitive sub-layers are generally arranged closer to the support than the more highly sensitive sub-layers.

A yellow filter layer is conventionally arranged between the green-sensitive and blue-sensitive layers which prevents blue light from reaching the underlying layers.

Possible options for different layer arrangements and the effects thereof on photographic properties are described in J

*Inf. Rec. Mats.,* 1994, volume 22, pages 183–193 and in *Research Disclosure* 38957, part XI (1996), page 624.

Colour photographic paper, which is usually substantially less photosensitive than a colour photographic film, conventionally has on the support, in the stated sequence, one blue-sensitive, yellow-coupling silver halide emulsion layer, one green-sensitive, magenta-coupling silver halide emulsion layer and one red-sensitive, cyan-coupling silver halide emulsion layer; the yellow filter layer may be omitted.

The number and arrangement of the photosensitive layers may be varied in order to achieve specific results. For example, all high sensitivity layers may be grouped together in one package of layers and all low sensitivity layers may be grouped together in another package of layers in order to increase sensitivity (DE-25 30 645).

The substantial constituents of the photographic emulsion layers are binder, silver halide grains and colour couplers.

Details of suitable binders may be found in *Research Disclosure* 37254, part 2 (1995), page 286 and in *Research Disclosure* 38957, part II.A (1996), page 598.

Details of suitable silver halide emulsions, the production, ripening, stabilisation and spectral sensitisation thereof, including, for the purposes of the present invention, spectral sensitisers to be used in addition to the cyanine dyes according to the invention, may be found in *Research Disclosure* 37254, part 3 (1995), page 286, in *Research Disclosure* 37038, part XV (1995), page 89 and in *Research Disclosure* 38957, part V.A (1996), page 603.

For the purposes of the present invention, in a preferred embodiment, the emulsions used comprise tab-grain emulsions. These should be taken to mean emulsions containing tabular silver halide crystals with an aspect ratio of >2, wherein the aspect ratio is the ratio of the diameter of a circle of the same area as the projected surface area to the thickness of the crystal.

Photographic materials with camera sensitivity conventionally contain silver bromide-iodide emulsions, which may optionally also contain small proportions of silver chloride. Photographic print materials contain either silver chloride-bromide emulsions with up to 80 mol % of AgBr or silver chloride-bromide emulsions with above 90 mol % of AgCl, for example even more than 95 mol %, more than 98 mol % or even more than 99 mol % to 100 mol % of AgCl.

Details relating to colour couplers may be found in *Research Disclosure* 37254, part 4 (1995), page 288, in *Research Disclosure* 37038, part 11 (1995), page 80 and in *Research Disclosure* 38957, part X.B (1996), page 616. The maximum absorption of the dyes formed from the couplers and the developer oxidation product is preferably within the following ranges: yellow coupler 430 to 460 nm, magenta coupler 540 to 560 nm, cyan coupler 630 to 700 nm.

In order to improve sensitivity, grain, sharpness and colour separation in colour photographic films, compounds are frequently used which, on reaction with the developer oxidation product, release photographically active compounds, for example DIR couplers which eliminate a development inhibitor.

Details relating to such compounds, in particular couplers, may be found in *Research Disclosure* 37254, part 5 (1995), page 290, in *Research Disclosure* 37038, part XIV (1995), page 86 and in Research Disclosure 38957, part X.C (1996), page 618.

Colour couplers, which are usually hydrophobic, as well as other hydrophobic constituents of the layers, are conventionally dissolved or dispersed in high-boiling organic solvents. These solutions or dispersions are then emulsified into an aqueous binder solution (conventionally a gelatine solution) and, once the layers have dried, are present in the layers as fine droplets (0.05 to 0.8 $\mu$m in diameter).

Suitable high-boiling organic solvents, methods for the introduction thereof into the layers of a photographic material and further methods for introducing chemical compounds into photographic layers may be found in *Research Disclosure* 3 7254, part 6 (1995), page 292.

The non-photosensitive interlayers generally located between layers of different spectral sensitivity may contain agents which prevent an undesirable diffuision of developer oxidation products from one photosensitive layer into another photosensitive layer with a different spectral sensitisation.

Suitable compounds (white couplers, scavengers or DOP scavengers) may be found in *Research Disclosure* 37254, part 7 (1995), page 292, in *Research Disclosure* 37038, part III (1995), page 84 and in *Research Disclosure* 38957, part X.D (1996), pages 621 et seq..

The photographic material may also contain UV light absorbing compounds, optical brighteners, spacers, filter dyes, formalin scavengers, light stabilisers, anti-oxidants, $D_{min}$ dyes, plasticisers (latices), biocides and additives to improve coupler and dye stability, to reduce colour fogging and to reduce yellowing and others. Suitable compounds may be found in *Research Disclosure* 37254, part 8 (1995), page 292, in *Research Disclosure* 37038, parts IV, V, VI, VII, X, XI and XIII (1995), pages 84 et seq. and in *Research Disclosure* 38957, parts VI, VIII, IX and X (1996), pages 607 and 610 et seq..

The layers of colour photographic materials are conventionally hardened, i.e. the binder used, preferably gelatine, is crosslinked by appropriate chemical methods.

Suitable hardener substances may be found in *Research Disclosure* 37254, part 9 (1995), page 294, in *Research Disclosure* 37038, part XII (1995), page 86 and in *Research Disclosure* 38957, part II.B (1996), page 599.

Once exposed with an image, colour photographic materials are processed using different processes depending upon their nature. Details relating to processing methods and the necessary chemicals are disclosed in *Research Disclosure* 37254, part 10 (1995), page 294, in *Research Disclosure* 37038, parts XVI to XXIII (1995), pages 95 et seq. and in *Research Disclosure* 38957, parts XVIII, XIX and XX (1996), pages 630 et seq. together with example materials.

EXAMPLES

Example 1

Crude emulsion

A solution of 144 g of inert gelatine and 107 g of potassium bromide in 18 kg of water was initially introduced with stirring. At 30° C., an aqueous silver nitrate solution (47 g of silver nitrate in 550 g of water) and an aqueous halide solution (33 g of potassium bromide in 550 g of water) were then apportioned as a twin inflow within 30 seconds. 395 g of inert gelatine in 4 kg of water were then added. After heating to 74° C., an aqueous silver nitrate solution (114 g of silver nitrate in 1.4 kg of water) were then added within 20 minutes.

The second twin inflow was then performed, likewise at 74° C. In this operation, an aqueous silver nitrate solution (1339 g of silver nitrate in 8.3 kg of water) and an aqueous halide solution (1117 g of potassium bromide in 9.8 kg of water) were apportioned within 50 minutes with a rising feed rate. The feed rate was here raised in 10 steps from an initial value of 70 ml/minute to 400 ml/minute. The pBr value of 2.3 in the dispersion medium was held constant during the inflow.

After the final inflow, the emulsion was cooled to 25° C., flocculated at pH 3.5 by addition of polystyrenesulfonic acid and then washed at 20° C. The flocculate was then redispersed with water, made up to 7.5 kg and redispersed at pH 6.5 and a temperature of 50° C.

The emulsion contained a fraction of above 80% (relative to the projected surface area of the crystals) of hexagonal lamellar crystals having an aspect ratio (average diameter of a circle of the same area as the projected surface area/thickness of the lamellar crystals) of 8 and an adjacent edge ratio of 1:1 to 1.5:1. The grain size was 0.55 μm and the distribution range 18%.

The silver halide emulsion was chemically ripened at 55° C., pAg 7.4 and pH 6.5 with 5.0 μmol of tetrachloroauric acid, 690 μmol of potassium thiocyanate and 20 μmol of sodium thiosulfate per mol of $AgNO_3$.

After addition of 350 μmol of 4-hydroxy-6-methyl-1,3,3a,7-tetraazaindene per 100 g of $AgNO_3$, the emulsion was spectrally sensitised by adding to the emulsion, which was at a temperature of 40° C., in each case 500 μmol of spectral sensitiser per mol of $AgNO_3$ dissolved in methanol or a mixture of methanol/phenoxyethanol and then stirring the mixture for a further 20 minutes at 40° C.

When sensitiser mixtures are used, the total is standardised in each case to 500 μmol/mol of $AgNO_3$. The sensitiser stated first in Tables 5 and 6 was also added to the emulsion first, after 20 minutes' stirring at 40° C. the second stabiliser was added and optionally after a further 20 minutes at 40° C., the third was added.

The emulsion was combined with an emulsion of the cyan coupler BG-1 and an emulsion of the cyan coupler BG-2 and applied onto a 120 μm gauge film support of subbed cellulose acetate.

Each m² of the individual cast layers contained:
AgBr corresponding to
  0.63 g of $AgNO_3$
  1.38 g of gelatine
  0.25 g of cyan coupler BG-1
  0.37 g of cyan coupler BG-2
  0.62 g of tricresyl phosphate The material was hardened by application of a protective layer prepared from 0.2 g of gelatine and 0.3 g of instant hardener (H-1) per m².

The sensitivities of the materials produced in this manner were determined. To this end, samples of the material were exposed behind a graduated wedge and subjected to colour negative processing according to *The Journal of Photographic Science*, 1974, pages 597, 598. The results are shown in Tables 1 to 3.

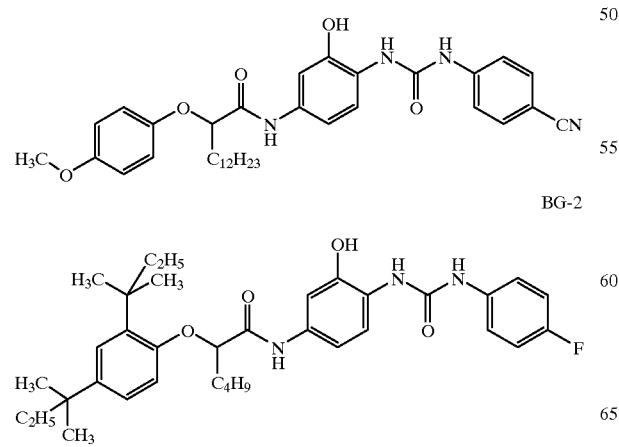

BG-1

BG-2

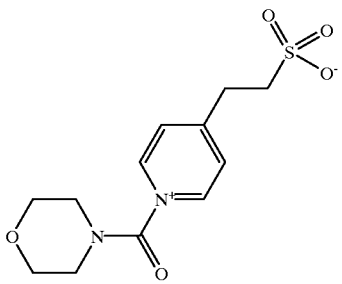

H-1

TABLE 1

| Spectral sensitisers | Sensitivity* | Type of sample |
|---|---|---|
| I-1 | 0.97 | Invention |
| I-17 | 1.00 | Invention |
| V-1 | 0.91 | Comparison |
| V-2 | 0.88 | Comparison |
| V-3 | 0.90 | Comparison |

*sensitivity standardised to that of I-17.

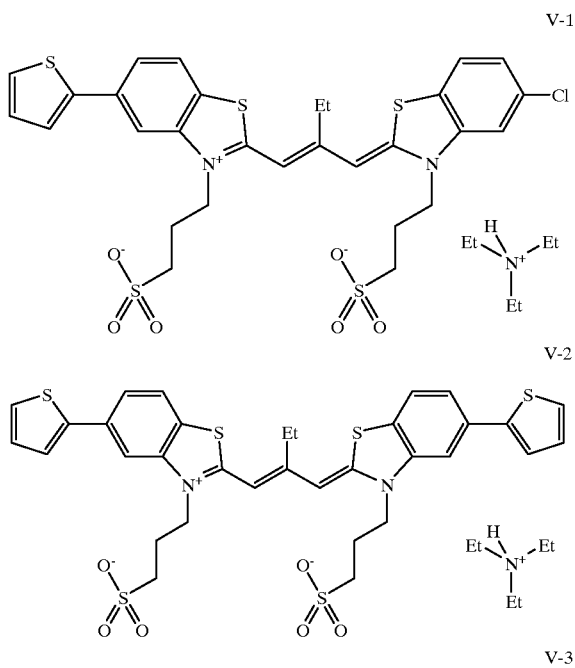

V-1

V-2

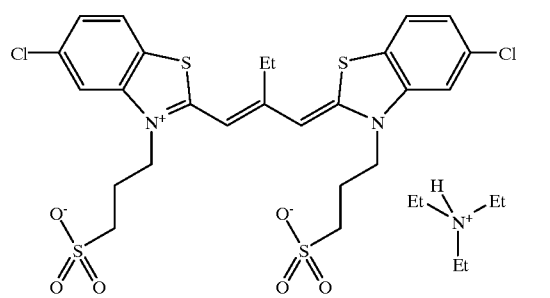

V-3

TABLE 2

| Spectral sensitiser mixture | Mixture ratio | Sensitivity* | Type of sample |
|---|---|---|---|
| II-9/I-1 | 1/1 | 0.95 | Invention |
| II-9/I-17 | 1/2 | 1.00 | Invention |
| II-9/V-1 | 1/1 | 0.86 | Comparison |
| II-9/V-2 | 1/2 | 0.92 | Comparison |
| II-9/V-3 | 1/2 | 0.93 | Comparison |

*Sensitivity standardised to the combination II-9/I-17.

TABLE 3

| Spectral sensitiser mixture | Mixture ratio | Sensitivity* | Type of sample |
|---|---|---|---|
| II-9/I-1/II-14 | 2/6/1 | 1.00 | Invention |
| II-9/I-17/II-14 | 2/5/0.2 | 0.98 | Invention |
| II-9/V-1/II-14 | 2/6/1 | 0.89 | Comparison |
| I-9/V-2/II-14 | 2/5/0.2 | 0.90 | Comparison |
| II-9/V-3/II-14 | 2/6/1 | 0.93 | Comparison |

*sensitivity is standardised to the combination II-9/I-1/II-14.

Example 2

Preparation of the crude photographic emulsion, the ripening and spectral sensitisation thereof were performed as in Example 1, except that the magenta coupler M-1 was used instead of the mixture of cyan couplers BG-1 and BG-2.

Each $m^2$ of the individual cast layers contained:

AgBr corresponding to 0.63 g of $AgNO_3$ 1.38 g of gelatine 0.95 g of magenta coupler M-1

0.29 g of tricresyl phosphate

The material was hardened by application of a protective layer prepared from 0.2 g of gelatine and 0.3 g of instant hardener (H-1) per $m^2$.

M-1

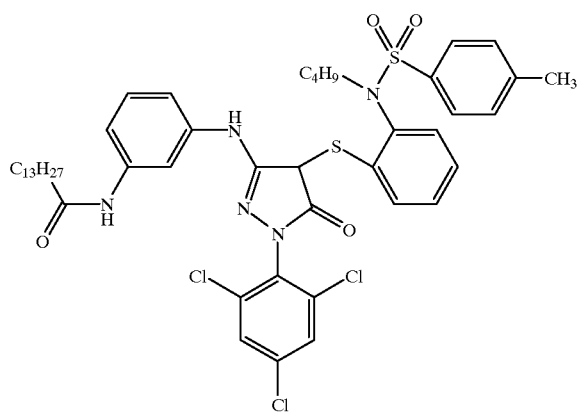

The sensitivities of the materials produced in this manner were determined. To this end, samples of the material were exposed behind a graduated wedge and subjected to colour negative processing according to *The Journal of Photographic Science*, 1974, pages 597, 598. The results are shown in Tables 4 and 5.

TABLE 4

| Spectral sensitiser | Sensitivity* | Type of sample |
|---|---|---|
| I-4 | 0.97 | Invention |
| I-5 | 1.00 | Invention |
| V-3 | 0.91 | Comparison |
| V-4 | 0.90 | Comparison |

*sensitivity is standardised to that of I-5.

V-4

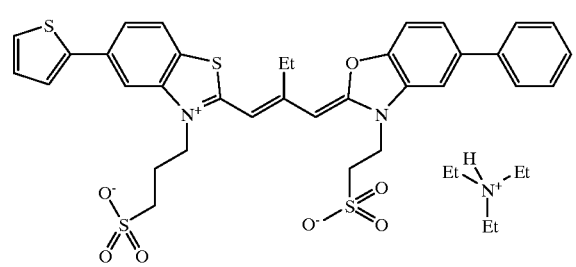

V-5

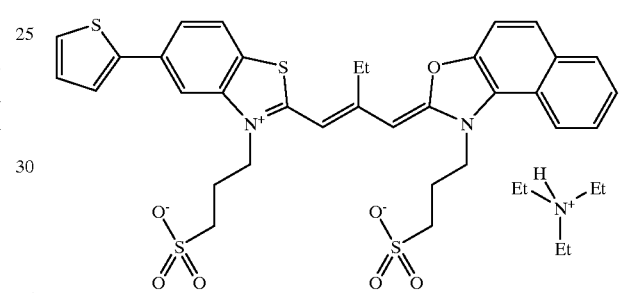

TABLE 5

| Spectral sensitisers | Mixture ratio | Sensitivities* | Type of sample |
|---|---|---|---|
| (II)-1/(II)-18/(I)-4 | 10/3/1 | 0.99 | Invention |
| (II)-1/(II)-18/(I)-5 | 10/3/1 | 1.00 | Invention |
| (II)-1/(II)-18/V-4 | 10/3/1 | 0.89 | Comparison |
| (II)-1/(II)-18/V-5 | 10/3/1 | 0.88 | Comparison |

*sensitivity is standardised to the combination of (II)-1/(II)-18/(I)-5.

Example 3

Emulsion preparation and sensitisation

The following solutions were prepared, in each case using demineralised water:

| Solution 1 | 4000 g | water |
|---|---|---|
| | 500 g | gelatine |
| Solution 2 | 6700 g | water |
| | 1300 g | NaCl |
| | 0.4 mg | $K_2IrCl_6$ |
| | 0.2 mg | $Na_3RhCl_6$ |
| Solution 3 | 6500 g | water |
| | 3600 g | $AgNO_3$ |

Solutions 2 and 3 were simultaneously added at 45° C. with vigorous stirring to solution 1 over the course of 70 minutes at a pAg of 7.7. A silver chloride emulsion was obtained having an average particle diameter of 0.5 μm. The gelatine/$AgNO_3$ weight ratio was 0.14. The emulsion was ultrafiltered, washed and redispersed in a known manner with such a quantity of gelatine that the gelatine/AgNO₃ weight ratio was 0.56. The silver halide content was 1.5 mol per kg of emulsion. The emulsion was combined at a pH value of 5.3 with stirring with 18 µmol of gold(III) chloride/mol of AgNO₃ and 7 µmol of Na₂S₂O₃/mol of AgNO₃. After 5 minutes, 200 mg of compound A were added and the emulsion was then ripened for 3 hours at 70° C. with stirring. After cooling to 50° C., the emulsion was spectrally sensitised by adding 50 µmol of spectral sensitiser per mol of AgNO₃ (dissolved in methanol, 0.1% solution) and stabilised by adding 2 g of B/kg of AgNO₃.

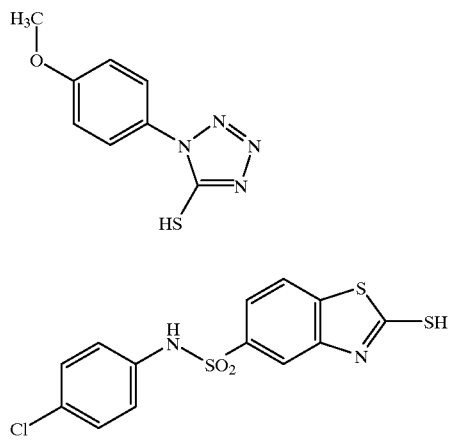

A

B

A photographic recording material comprising the following layers was produced on a paper support coated with polyethylene:

| 1) Layer (red-sensitive, cyan-coupling) | |
|---|---|
| Emulsion | 0.30 g/m² of AgNO₃ |
| Cyan coupler K-BG | 0.42 g/m² |
| Tricresyl phosphate | 0.42 g/m² |
| 2) Protective layer | |
| Gelatine | 1.60 g/m² |
| 3) Hardening layer | |
| Hardener H | 0.20 g/m² |

The material was exposed for 40 ms through a step wedge and processed using process AP 94 as below.

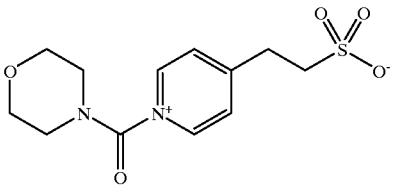

H

| Colour developer-45 s-35° C. | |
|---|---|
| Triethanolamine | 9.0 g |
| N,N-diethylenehydroxylamine | 4.0 g |
| Diethylene glycol | 0.05 g |
| 3-Methyl-4-amino-N-ethyl-N-methanesulphonaminoethylaniline sulphate | 5.0 g |
| Potassium sulphite | 0.2 g |
| Triethylene glycol | 0.05 g |
| Potassium carbonate | 22 g |
| Potassium hydroxide | 0.4 g |
| Ethylenediaminetetraacetic acid, disodium salt | 2.2 g |
| Potassium chloride | 2.5 g |
| 1,2-Dihydroxybenzene-3,4,6-trisulphonic acid, sodium salt | 0.3 g | make up with water to 1000 ml (pH=10.0)

| Bleach/fixing bath-45 s-35° C. | |
|---|---|
| Ammonium thiosulphate | 75 g |
| Sodium hydrogen sulphite | 13.5 g |
| Ammonium acetate | 2.0 g |
| Ethylenediaminetetraacetic acid (iron/ammonium salt) | 57 g |
| Ammonia, 25 wt. % | 9.5 g | make up with acetic acid to 1000 ml (pH=5.5)

Rinsing: 2min-33° C

Drying

The red sensitivities of the resultant materials were determined. The values are shown in the table.

TABLE

| Dye | Sensitivity* | Sample type |
|---|---|---|
| I-19 | 1.00 | Invention |
| I-23 | 0.96 | Invention |
| V-6 | 0.90 | Comparison |
| V-7 | 0.93 | Comparison |
| V-8 | 0.91 | Comparison |

*sensitivity standardised to that of I-19.

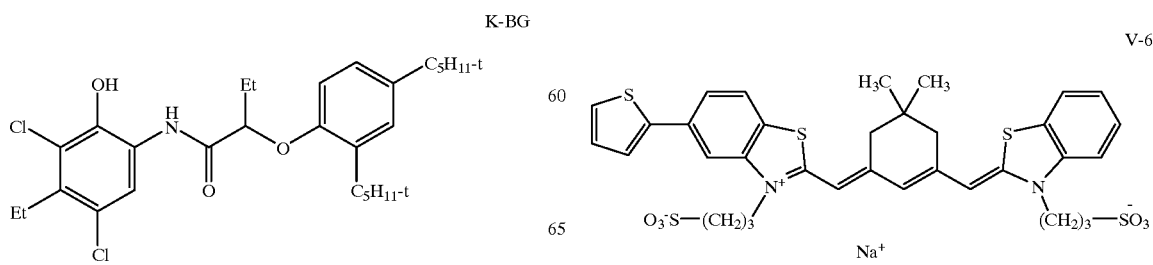

K-BG

V-6

-continued

V-7

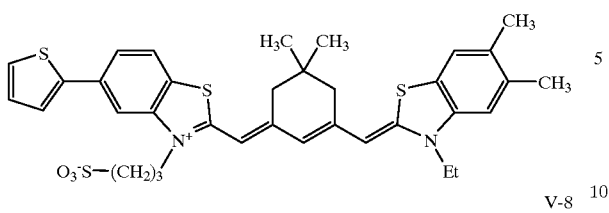

V-8

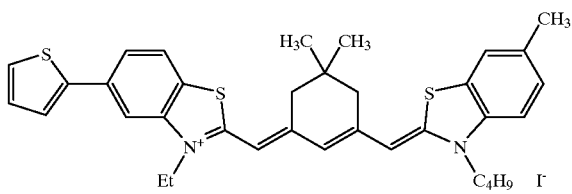

What is claimed is:

1. A color photographic silver halide material which comprises at least one photosensitive silver halide emulsion, and contains at least one cyanine dye of the formula (I)

(I)

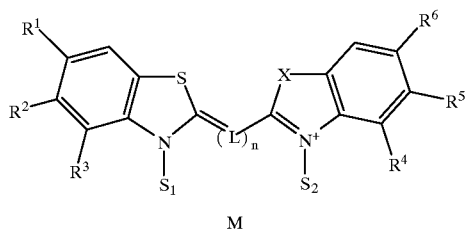

in which $R^1$, $R^2$, $R^3$, $R^4$, $R^5$ and $R^6$ mutually independently mean H, a substituent or $R^5$ together with $R^6$ or $R^4$ together with $R^5$ form an optionally substituted fused benzo ring or naphtho ring system, providing that at least one of the substituents $R^1$, $R^2$ or $R^3$ is a benzothienyl substituent, X denotes O, S, Se, CH=CH, C(CH$_3$)$_2$, or NR$_7$ (R$_7$ is substituted or unsubstituted alkyl), S$_1$ and S$_2$ mutually independently mean alkyl, sulfoalkyl, carboxyalkyl, —(CH$_2$)$_l$—SO$_2$—Y—SO$_2$-alkyl, —(CH$_2$)$_l$-13 SO$_2$—Y—CO-alkyl, —(CH$_1$)$_l$NHSO$^-$$_3$, —(CH$_2$)$_l$—N(alkyl)SO$^-$$_3$, —(CH$_2$)$_l$—N(aryl)SO$^-$$_3$ or —(CH$_2$)$_l$—CO—Y—CO-akyl, providing that l means 1 to 6 and Y is NH or N$^-$, n means 3, 5 or 7, L denotes substituted or unsubstituted methine groups, which are optionally constituents of one or more carbocyclic rings, and M denotes a counterion optionally necessary to equalize charges.

2. The color photographic silver halide material according to claim 1, which further comprises at least one cyanine dye of the formula (II)

(II)

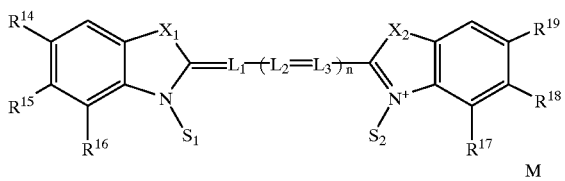

in which

X, and X$_2$ mutually independently denote O, S, Se, CH=CH, C(CH$_3$)$_2$ or NR$_7$ (R$_7$=is a substituted or unsubstituted alkyl), S$_1$ and S$_2$ mutually independently mean alkyl, sulfoalkyl, carboxyalkyl, —(CH$_2$)$_l$—SO$_2$—Y—SO$_2$-alkyl, —(CH$_2$)$_l$—SO$_2$—Y—CO-alkyl, —(CH$_2$)$_l$—CO—Y—SO$_2$-alkyl or —(CH$_2$)$_l$—CO—Y—CO-alkyl (l=1–6, Y is NH or N$^-$), $R^{14}$, $R^{15}$, $R^{16}$, $R^{17}$, $R^{18}$ and $R^{19}$ mutually independently denote H, halogen, alkyl, alkoxy, phenyl, 2-thienyl, 3-thienyl, 1-pyrrolyl, 1-indolyl, 2-furanyl, 3-furanyl, CN, CF$_3$ or aryl; or $R^{14}$ together with $R^{15}$ or $R^{15}$ together with $R^{16}$ or $R^{19}$ together with $R^{18}$ or $R^{18}$ together with $R^{17}$ form an optionally substituted fused benzo or naphtho ring system, n means 0 or 1, L$_1$, L$_2$ and L$_3$ mutually independently denote substituted or unsubstituted methine groups and M denotes a counterion optionally necessary to equalize charges.

3. The color photographic silver halide material according to claim 2, wherein one cyanine dye according to the formula (II) is used with two cyanine dyes according to the formula (I).

4. The color photographic silver halide material according to claim 2, wherein the cyanine dyes according to the formulae (I) and (II) are present in a mixture ratio of 0.1:10 or 10:0.1.

5. The color photographic silver halide material according to claim 2, wherein one cyanine dye according to the formula (I) is used with two cyanine dyes according to the formula (II).

6. The color photographic silver halide material according to claim 2, wherein $R^{14}$, $R^{15}$, $R^{16}$, $R^{17}$, $R^{18}$ and $R^{19}$ mutually independently denote H, fluorine, chlorine, bromine, alkyl, alkoxy, phenyl, 2-thienyl, 3-thienyl, 1-pyrrolyl, 1-indolyl, 2-furanyl, 3-furanyl, CN, CF$_3$ or aryl.

7. The color photographic silver halide material according to claim 1, which further comprises tab-grain emulsions.

8. The color photographic silver halide material according to claim 1, wherein the benzathienyl residue is attached to the benzo ring at 2, 3, 4, 5, 6 or 7 position.

9. The color photographic silver halide material according to claim 1, wherein n is 3 and L is

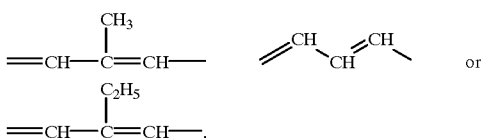

10. The color photographic silver halide material according to claim 1, wherein n is 5 and L is

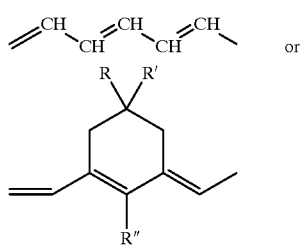

wherein R and R¹ independently denote H, aryl or alkyl and R" denotes H, halogen, N-tetrahydropyrrolyl, N-piperidinyl, N-(alkyl)$_2$ N-(aryl)$_2$ or S-alkyl.

11. The color photographic silver halide material according to claim 1, wherein n is 7 and L is

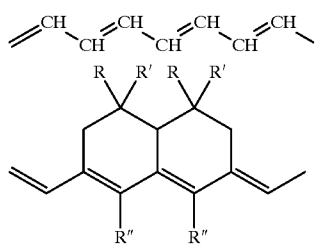

-continued

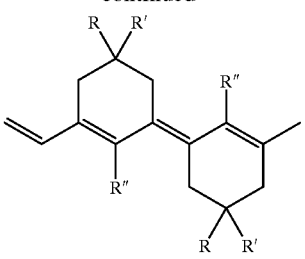

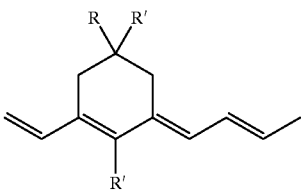

wherein R and R¹ independently denote H, aryl or alkyl and R" denotes H, halogen, N-tetrahydropyrrolyl, N-piperidinyl, N-(alkyl)$_2$ or S-alkyl.

* * * * *

UNITED STATES PATENT AND TRADEMARK OFFICE
CERTIFICATE OF CORRECTION

PATENT NO. : 6,258,523 B1
DATED : July 10, 2001
INVENTOR(S) : Missfeldt et al.

Page 1 of 1

It is certified that error appears in the above-identified patent and that said Letters Patent is hereby corrected as shown below:

Column 33, claim 1,
Line 52, "-CH$_2$)$_t$-13 SO$_2$-" should read as -- CH$_2$)$_t$-SO$_2$ --
Line 53, "-CH$_1$)$_t$NHSO$^-$$_3$," should read as -- CH$_2$)$_t$NHSO$^-$$_3$, --
Line 55, "Y-CO-akyl, providing that 1 means 1 to 6 and y is NH" should read as -- Y-CO-alkyl, providing that $t$ means 1 to 6 and y is NH --

Column 34, claim 2,
Line 13 "X, and X$_2$" should read as -- X$_1$ and X$_2$ --
Line 20, "(1=1-6, Y" should read as -- ($t$=1-6, Y --

Column 35, claim 10,
Line 15, "N-(alkyl)$_2$ N-(aryl)$_2$" should read as -- N-(alkyl)$_2$, N-(aryl)$_2$ --

Signed and Sealed this

Fifth Day of March, 2002

*Attest:*

JAMES E. ROGAN
*Attesting Officer*     Director of the United States Patent and Trademark Office